(12) United States Patent
Maeda et al.

(10) Patent No.: US 11,913,797 B2
(45) Date of Patent: Feb. 27, 2024

(54) SYSTEMS AND METHODS FOR SELECTING A CHARGING ENTITY BASED ON OCCUPANCY STATUS

(71) Applicant: Honda Motor Co., Ltd., Tokyo (JP)

(72) Inventors: Eri Izumi Maeda, Rancho Palos Verdes, CA (US); David Wong Cun, Fountain Valley, CA (US); Richard Pham, Lakewood, CA (US)

(73) Assignee: Honda Motor Co., Ltd., Tokyo (JP)

( * ) Notice: Subject to any disclaimer, the term of this patent is extended or adjusted under 35 U.S.C. 154(b) by 194 days.

(21) Appl. No.: 17/529,651

(22) Filed: Nov. 18, 2021

(65) Prior Publication Data

US 2023/0152111 A1    May 18, 2023

(51) Int. Cl.
| | |
|---|---|
| *G01C 21/34* | (2006.01) |
| *B60L 53/63* | (2019.01) |
| *B60L 53/66* | (2019.01) |
| *B60L 58/12* | (2019.01) |

(52) U.S. Cl.
CPC .......... *G01C 21/3476* (2013.01); *B60L 53/63* (2019.02); *B60L 53/66* (2019.02); *B60L 58/12* (2019.02)

(58) Field of Classification Search
CPC ..... G01C 21/3476; B60L 53/66; B60L 58/12; B60L 53/63
See application file for complete search history.

(56) References Cited

U.S. PATENT DOCUMENTS

| | | |
|---|---|---|
| 8,825,354 B2 | 9/2014 | Horita |
| 9,197,091 B2 | 11/2015 | Kishiyama et al. |
| 10,377,265 B2 | 8/2019 | Wytock et al. |

(Continued)

FOREIGN PATENT DOCUMENTS

| | | |
|---|---|---|
| CN | 205646853 | 10/2016 |
| CN | 104821624 B | * 8/2017 |

(Continued)

OTHER PUBLICATIONS

English translation of CN-107038595-A (Year: 2017).*

(Continued)

*Primary Examiner* — Anshul Sood
*Assistant Examiner* — Matthew Ho
(74) *Attorney, Agent, or Firm* — RANKIN, HILL & CLARK LLP

(57) ABSTRACT

Systems and methods for selecting a charging entity based on occupancy status are provided. In one embodiment, a method includes determining a current geo-location and state of charge of a requesting vehicle. A plurality of charging entities that are within a remaining distance of the requesting vehicle are identified. Occupancy statuses for one or more charging entities of the plurality of charging entities are determined. The method also includes estimating charging speeds for the one or more charging entities based on the occupancy statuses. A charging station map user interface that pin points the current geo-location of the requesting vehicle and the one or more charging entities is presented. The one or more charging entities are presented with labels based on the charging speeds. The method further includes reserving a charging station of a selected charging entity of the plurality of charging entities by selecting a label.

19 Claims, 5 Drawing Sheets

(56) References Cited

U.S. PATENT DOCUMENTS

| | | |
|---|---|---|
| 10,464,547 B2 | 11/2019 | Park et al. |
| 2011/0191265 A1 | 8/2011 | Lowenthal et al. |
| 2012/0109519 A1* | 5/2012 | Uyeki .................. B60L 53/68 701/426 |
| 2015/0077239 A1 | 3/2015 | Litjen |
| 2015/0294329 A1 | 10/2015 | Saito et al. |
| 2017/0110895 A1* | 4/2017 | Low ..................... B60L 53/63 |
| 2017/0282744 A1* | 10/2017 | Koo .................... B60L 53/305 |
| 2019/0351783 A1 | 11/2019 | Goi |
| 2020/0378784 A1* | 12/2020 | Katanoda ........... G01C 21/3661 |
| 2021/0060801 A1* | 3/2021 | Kwak .................. B25J 9/1682 |
| 2021/0065073 A1 | 3/2021 | Maeda et al. |
| 2021/0213848 A1* | 7/2021 | Sun ...................... B60L 53/65 |

FOREIGN PATENT DOCUMENTS

| | | | | |
|---|---|---|---|---|
| CN | 107038595 A | * | 8/2017 | |
| CN | 109492791 | | 3/2019 | |
| CN | 110570050 | | 12/2019 | |
| CN | 112418524 | | 2/2021 | |
| DE | 102017215792 A1 | * | 3/2019 | ......... G01C 21/3469 |
| DE | 102019128618 A1 | * | 4/2021 | |
| KR | 102016985 | | 9/2019 | |
| KR | 102057649 | | 12/2019 | |
| KR | 20210044355 A | * | 4/2021 | |
| KR | 102278697 | | 7/2021 | |
| WO | WO2011156776 | | 12/2011 | |
| WO | WO2019243276 | | 12/2019 | |

OTHER PUBLICATIONS

English translation of DE-102019128618-A1 (Year: 2021).*
English translation of DE-102017215792-A1 (Year: 2019).*
English translation of KR 20210044355 A (Year: 2021).*
English translation of CN-104821624-B (Year: 2017).*

* cited by examiner

SYSTEMS AND METHODS FOR SELECTING A CHARGING ENTITY BASED ON OCCUPANCY STATUS

BACKGROUND

Electric vehicles contain electric storage mechanisms (e.g., electric engines powered by rechargeable batteries) to store electricity and power the electric vehicles. The electric storage mechanisms may be replenished periodically by using, for example, charging equipment installed at a residential home or charging equipment installed at public or private charging stations. In many cases, when users are attempting to find a charging station to charge their electric vehicle, the user may have a limited amount of time. Accordingly, the user may be interested in availability of charging stations at charging entities and their charging speeds. However, typically users do not have access to this information in advance.

BRIEF DESCRIPTION

According to one aspect, a computer-implemented method for selecting a charging entity based on occupancy status is provided. The computer-implemented method includes determining a current geo-location of a requesting vehicle. The computer-implemented method also includes determining a current state of charge of a battery of the requesting vehicle. The computer-implemented method further includes identifying a plurality of charging entities that are within a remaining distance that the requesting vehicle is capable of traveling based on the current geo-location of the requesting vehicle and the current state of charge of the battery of the requesting vehicle. A charging entity of the plurality of charging entities is associated with one or more charging stations configured to provide a charge to the requesting vehicle. The computer-implemented method yet further includes determining occupancy statuses for one or more charging entities of the plurality of charging entities. An occupancy status indicates a number of the one or more charging stations of the charging entity occupied by a charging vehicle. The computer-implemented method further includes estimating charging speeds for the one or more charging entities based on the occupancy statuses. The computer-implemented method also includes presenting a charging station map user interface that pin points the current geo-location of the requesting vehicle and the one or more charging entities. The one or more charging entities are presented with labels based on the charging speeds. The computer-implemented method further includes reserving a charging station of a selected charging entity of the plurality of charging entities by selecting a label of the one or more charging entities that is presented on the charging station map user interface.

According to another aspect, a system for selecting a charging entity based on occupancy status is provided. The system includes a memory storing instructions when executed by a processor cause the processor to determine a current geo-location of a requesting vehicle. The instructions when executed by the processor also cause the processor to determine a current state of charge of a battery of the requesting vehicle. The instructions when executed by the processor further cause the processor to identify a plurality of charging entities that are within a remaining distance that the requesting vehicle is capable of traveling based on the current geo-location of the requesting vehicle and the current state of charge of the battery of the requesting vehicle. A charging entity of the plurality of charging entities is associated with one or more charging stations configured to provide a charge to the requesting vehicle. The instructions when executed by the processor yet further cause the processor to determine occupancy statuses for one or more charging entities of the plurality of charging entities. An occupancy status indicates a number of the one or more charging stations of the charging entity occupied by a charging vehicle. The instructions when executed by the processor cause the processor to estimate charging speeds for the one or more charging entities based on the occupancy statuses. The instructions when executed by the processor also cause the processor to present a charging station map user interface that pin points the current geo-location of the requesting vehicle and the one or more charging entities. The one or more charging entities are presented with labels based on the charging speeds. The instructions when executed by the processor also cause the processor to reserve a charging station of a selected charging entity of the plurality of charging entities by selecting a label of the one or more charging entities that is presented on the charging station map user interface.

According to still another aspect, a non-transitory computer readable storage medium storing instructions that when executed by a computer, which includes a processor perform a method, the method includes determining a current geo-location of a requesting vehicle. The method also includes determining a current state of charge of a battery of the requesting vehicle. The method further includes identifying a plurality of charging entities that are within a remaining distance that the requesting vehicle is capable of traveling based on the current geo-location of the requesting vehicle and the current state of charge of the battery of the requesting vehicle. A charging entity of the plurality of charging entities is associated with one or more charging stations configured to provide a charge to the requesting vehicle. The method yet further includes determining occupancy statuses for one or more charging entities of the plurality of charging entities. An occupancy status indicates a number of the one or more charging stations of the charging entity occupied by a charging vehicle. The method further includes estimating charging speeds for the one or more charging entities based on the occupancy statuses. The method also includes presenting a charging station map user interface that pin points the current geo-location of the requesting vehicle and the one or more charging entities. The one or more charging entities are presented with labels based on the charging speeds. The method further includes reserving a charging station of a selected charging entity of the plurality of charging entities by selecting a label of the one or more charging entities that is presented on the charging station map user interface.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
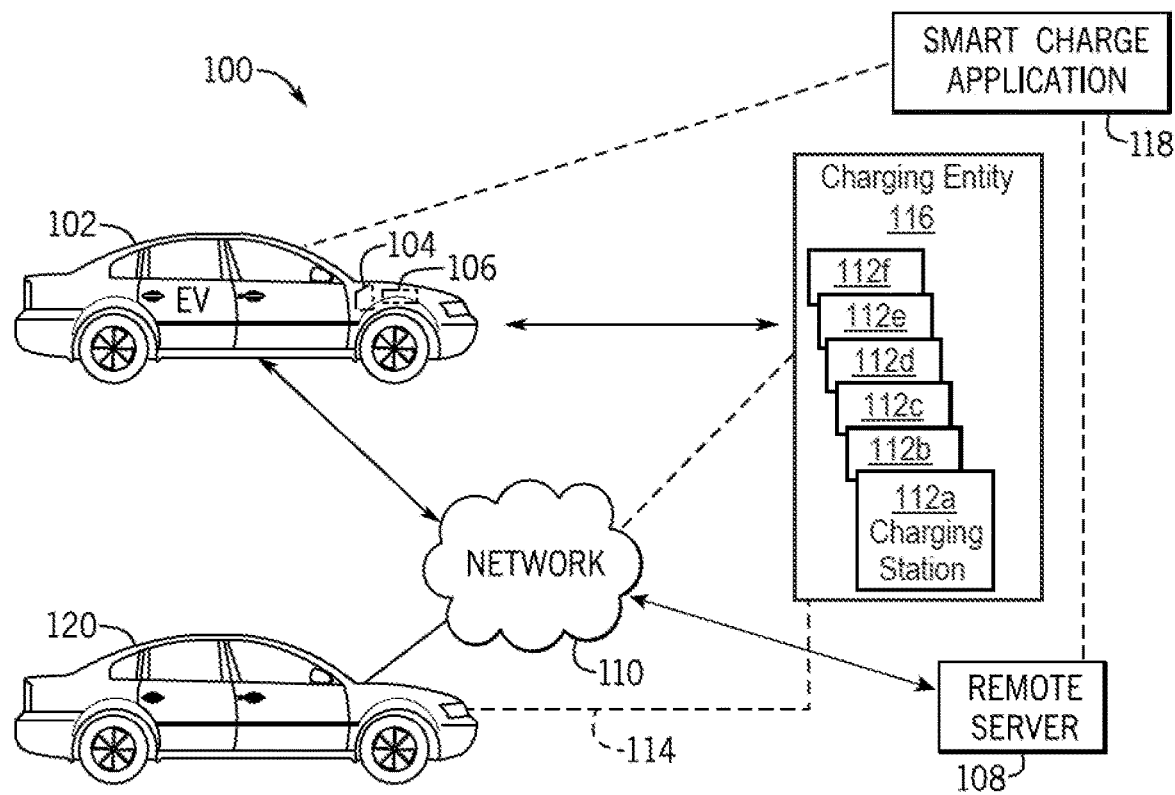
FIG. 1 is a high-level schematic view of an illustrative system for according to an exemplary embodiment of the present disclosure.

A charging entity may have a number of charging stations for providing a requesting vehicle with a charge. The charging entity may manage the charging stations. For example, the charging entity may manage the schedules of individual charging stations. A user may request a charging reservation from a charging entity, which responds by assigning the user a particular charging station for charging their vehicle to a target state of charge (SOC). The target SOC may be provided by the user and/or by the requesting vehicle.

However, the user may not know how long it will take a charging station of the charging entity to charge the vehicle because charging entity parameters, such as occupancy status, affect the charging speed. Furthermore, users typically do not have access to charging entity parameters that delve into the inner workings of the charging entity. The occupancy status describes the number of charging stations of a charging entity that are in use. For example, the occupancy status may be the number of charging stations of the charging entity that are providing a charge to vehicles versus the total number of charging stations of the charging entity. For example, suppose that a charging entity has ten charging stations and six are currently providing charge to charging vehicles, then the occupancy status of the charging entity would be 60%.

The occupancy status may negatively impact the charging speed that charging stations of the charging entity are able to provide. In particular, the higher the occupancy status the lower the charging speed. Because the occupancy status affects the charging speed, the occupancy status can facilitate a user making an informed decision when selecting a charging entity. However, a user may not understand the impact of occupancy on charging speed. Moreover, even if users could do this, it would be detrimental to the user experience as users do not want to perform arduous calculations or access remote databases to determine availability and charging speeds.

The systems and method are directed to selecting a charging entity based on occupancy status. For example, the systems and methods described herein provide information to the user so can make an informed choice based on occupancy status. In particular, when a user requests a charging reservation, a number of charging entities may be identified. The charging speed of each of the charging entities is estimated based on the occupancy status of the corresponding charging entity. Charging entities may then be recommended to the user based on the estimated charging speed. Suppose that for one charging entity there are a number of charging vehicles making the charging speed lower, this charging entity would be avoided. Accordingly, the user can make a more informed decision when selecting a charging entity. Additionally, the user can make this decision before arriving at the charging entity.

Definitions

The following includes definitions of selected terms employed herein. The definitions include various examples and/or forms of components that fall within the scope of a term and that may be used for implementation. The examples are not intended to be limiting.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect network (LIN), among others.

"Charging station," as used here, refers to an access point to an energy source that a vehicle can engage to receive a charge. Accordingly, the charging station is an element in an energy infrastructure capable of transferring energy, for example, from the grid to a vehicle. The charging station may include a connector to connect to the vehicle to the charging station. For example, the charge connector may include a range of heavy duty or special connectors that conform to the variety of standards, such as DC rapid charging, multi-standard chargers, and AC fast charging, etc.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication," as used herein, refers to a communication between two or more communicating devices (e.g., computer, personal digital assistant, cellular telephone, network device, vehicle, vehicle computing device, infrastructure device, roadside equipment) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a pointto-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wide-band (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface," as used herein can include input and/or output devices for receiving input and/or devices for outputting data. The input and/or output can be for controlling different vehicle features, which include various vehicle components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface, which can be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk, data store, and/or a memory.

"Data store," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Display," as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be accessible through various devices, for example, though a remote system. The display may also be physically located on a portable device, mobility device, or vehicle.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DR-RAM). The memory can store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software-controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"Station systems," as used herein can include, but is not limited to, any system that can be used to enhance the charge capability, use, and/or safety of a charging station. Exemplary station systems include, but are not limited to: a monitoring system, a vehicle identification system, a user detection system, communication system, a charge allocation system, a charge management system, a scheduling system, a sensory system, and a camera system among others.

"Value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

"Vehicle," as used herein, refers to any moving vehicle powered wholly or partially by any form of rechargeable energy. The term "vehicle" includes, but is not limited to, cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more users and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle. The autonomous vehicle can carry one or more users. Further, the term "vehicle" can include vehicles that are automated or non-automated with predetermined paths or free-moving vehicles.

I. System Overview

Referring now to the drawings, wherein the showings are for purposes of illustrating one or more exemplary embodiments and not for purposes of limiting same, FIG. 1 is a high-level schematic view of an illustrative system 100 for selecting a charging entity based on occupancy status according to an exemplary embodiment of the present disclosure. The components of the system 100, as well as the components of other systems and architectures discussed herein, may be combined, omitted or organized into different architectures for various embodiments.

In the exemplary embodiment of FIG. 1, the system 100 includes a requesting vehicle 102 powered by an electric motor 104 and an electric storage mechanism, for example, a battery 106. In one embodiment, the requesting vehicle 102 is purely electric in that it only has the electric motor 104. In other embodiments, the requesting vehicle 102 may have the electric motor 104 and an internal combustion engine (not shown). In some embodiments, the requesting vehicle 102 may have any number of electric motors, batteries, and/or internal combustion engines and they may operate in series (e.g., as in an extended range electric vehicle), in parallel, or some combination of series and parallel operation.

The requesting vehicle 102 may be operably connected for computer communication to a remote server 108 via a wireless communication network 110. The requesting vehicle 102 may transmit and receive data (e.g., state of charge data, energy cost data, charging commands/signals) to and from the remote server 108, and vice versa, through the network 110. The remote server 108 may be a remote computing system or a device remote (e.g., off-board) from the requesting vehicle 102. The system architectures of the requesting vehicle 102 and the remote server 108 will be discussed in more detail herein with reference to FIG. 2 and FIG. 3, respectively.

In the exemplary embodiment of FIG. 1, the system 100 may include charging stations 112 that are capable of connecting to the requesting vehicle 102 via a (respective) charging link 114. The charging stations 112 may include charging equipment (not shown) that may replenish the battery 106 of the requesting vehicle 102 with charging power. Additionally, the charging stations 112 may be operably connected for computer communication with the requesting vehicle 102 and/or the remote server 108, for example, to transmit and receive data (e.g., charge parameters, charging data and feedback, vehicle system data) to and from the requesting vehicle 102 and/or the remote server 108. The charging link 114 may be a wired or wireless link to the charging stations 112. Computer communication may occur also via the charging link 114 and/or a wired or wireless communication link. In one embodiment, the requesting vehicle 102, the charging stations 112 and/or the charging link 114 may be operably controlled to indicate availability, such as whether a charging station 112 is occupied or not.

The charging stations 112 may include charging equipment that can be installed at a residential home or outside a residential home, for example, at a public (e.g., non-networked) or private (e.g., networked) charging station(s). The charging stations 112 may include a charging station identification designation (e.g., identification number, serial number, alpha-numeric code, station name) that may be used to identify particular charging stations 112. The charging stations 112 may replenish the battery 106 using a charging energy source type that indicates the type of energy the charging stations 112 provides. Energy may include clean renewable energy and non-renewable energy. Clean renewable energy may include, solar energy, hydro energy, biomass energy, wind energy, among others. Non-renewable energy may include electricity from a grid source, and in the case of hybrid vehicles, fossil fuels.

In one or more configurations, the requesting vehicle 102 may be configured of being capable of being fast charged based on fast charging components (not shown) that may be operably connected to the battery 106 and/or that may be included as part of the battery 106. Fast charging may enable the requesting vehicle 102 to be charged at a faster charging speed (e.g., than a default charging speed) when being charged by a fast charging electric charging equipment (not shown) that may be included at the charging stations 112. In particular, fast charging may provide a higher charging voltage from a default/conventional charging voltage (e.g., increase from 240 volts to 480 volts) to more quickly charge the battery 106 of the requesting vehicle 102. Accordingly, during utilization of fast charging the battery 106 of the requesting vehicle 102 may be more quickly charged to a particular state of charge level than during the utilization of a conventional electric vehicle charging speed. The charging stations 112 may thereby provide a particular charging rate structure that may pertain to the utilization of the conventional electric vehicle charging speed. Additionally, the charging stations 112 may provide a particular charging rate structure that may pertain to the utilization of the fast-electric vehicle charging speed. In this manner, the charging stations 112 may have different default charging speeds such as a standard charging speed and a fast charging speed.

In an exemplary embodiment, the requesting vehicle 102, the charging stations 112, and/or the remote server 108 may receive and transmit data through the network 110 to and from a charging entity 116. The charging entity 116 may include one or more computing devices (not shown) that may communicate with one or more charging station business entities (e.g., charging station corporate owner) that may include utility providers, fuel providers, and/or entities that own and/or operate one or more various types of charging stations, fuel stations, energy stations, and the like. The charging entity 116 may manage the charging stations 112 including charging station 112a, charging station 112b, charging station 112c, charging station 112d, charging station 112e, and charging station 112f although it will be understood that the charging entity 116 may manage more or fewer charging stations 112.

The charging entity 116 may receive perspective and/or real-time price data that may be provided by each respective charging stations 112 to communicate different charging rates. The perspective and/or real-time price data may include charging rates during a certain period of time (e.g., hourly, daily, weekly), charging rates to charge the requesting vehicle 102 at various charging speeds (e.g., standard charging speed, fast charging speed, charging power levels), charging rates that may be based on a customer rating that may be applied to a user of the requesting vehicle 102, and/or charging rates that may be applied to the user of the requesting vehicle 102 based on one or more incentives, discounts, and/or credits that may be provided.

The system 100 may include a charge application 118 that may provide various types of enhancements (e.g., generate and provide users information regarding vehicle charging, facilitate making reservations, etc.) that may be applicable to the charging of the requesting vehicle 102. The charge application 118 may be executed by the requesting vehicle 102 (e.g., a processor, an electronic control unit) and/or the remote server 108 (e.g., a processor). The charge application 118 may include various modules and/or logic, as will be discussed in greater detail below with respect to FIG. 4, to provide enhancements to the charging systems from the perspective of the user of the requesting vehicle 102, as discussed below.

The charge application 118 may be configured to provide one or more user interfaces to the user of the requesting vehicle 102 that may allow the user to visually compare charging speeds, charging rates, charging infrastructure, occupancy status, charging queues, and/or additional charging related information that may pertain to various charging stations 112 that may be located within a particular vicinity of a real-time geo-location(s) of the requesting vehicle 102, a perspective (e.g., predicted) geo-location(s) of the requesting vehicle 102, and/or a dynamically based determined geo-location(s) that may be based on one or more factors associated with the requesting vehicle 102. The charge application 112 may also receive user input from the user regarding the charge of the requesting vehicle 102, such as initiating a charge, terminating a charge, and requesting a charging reservation, among others.

The charge application 118 may be configured to facilitate computer communication between the requesting vehicle 102 and the charging vehicle 120. The charge application may allow the requesting vehicle 102 and/or the charging vehicle to send and receive charging status, location data, sensor data, charging reservation information, and other charging data indicative of the historical charging sessions, present charging, and/or future plans to charge the requesting vehicle 102 and/or the charging vehicle 120. For example, if the charging vehicle 120 is present at the charging entity 116, the charging vehicle 120 may provides sensor data, such as image or ranging data, regarding the parking area of the charging entity 116. The charge application 118 may facilitate communication.

Figure 2:
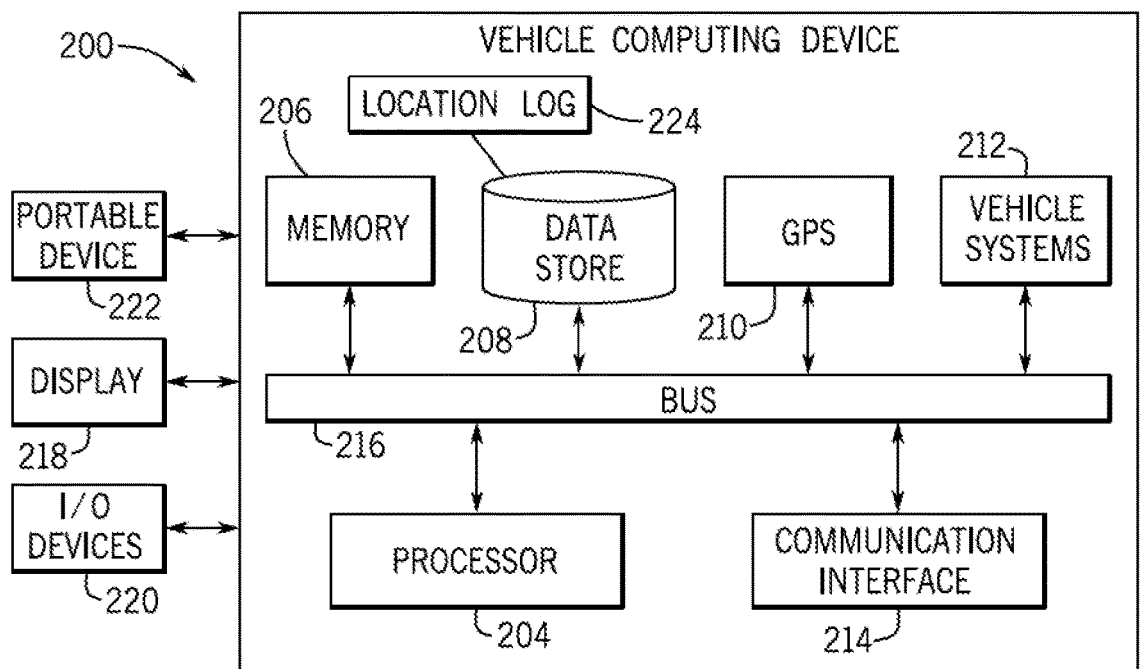
FIG. 2 is a schematic view of an illustrative electric vehicle architecture according to an exemplary embodiment of the present disclosure.

Referring now to FIG. 2, a schematic view of an illustrative electric vehicle architecture 200, for example the requesting vehicle 102 of FIG. 1, is shown according to an exemplary embodiment. In particular, the requesting vehicle 102 may include a vehicle computing device 202 (e.g., a telematics unit, an electronic control unit) with provisions for processing, communicating and interacting with various components of the requesting vehicle 102 and other components of the system 100. The vehicle computing device 202 may include a processor 204, a memory 206, a data store 208, a position determination device 210 (GPS), a plurality of vehicle systems 212 (e.g., including the electric motor 104, the battery 106) and a communication interface 214. The components of the architecture 200, including the vehicle computing device 202, may be operably connected for computer communication via a bus 216 (e.g., a Controller Area Network (CAN) or a Local Interconnect Network (LIN) protocol bus) and/or other wired and wireless technologies. The vehicle computing device 202 as well as the requesting vehicle 102 may include other components and systems not shown.

The data store 208 may store application data that may also include data pertaining to the charge application 118. In one embodiment, the data store 208 of the requesting vehicle 102 may include a location log 224 that may optionally (e.g., based on user approval) keep a log of locations at which the requesting vehicle 102 is driven, parked, and/or charged. The location log 224 may be analyzed by the charge application 118 in comparison to point of interest data that may be provided by the charging entity 116 and stored on the data store 208 of the requesting vehicle 102 (e.g., pre-stored by the OEM) and/or stored on the data store 308 of the remote server 108 (e.g., pre-stored by a charging entity 116). Upon analyzing the location log 224, the charge application 118 may be configured to determine one or more travel routines that may be followed by the user of the requesting vehicle 102.

The communication interface 214 of the requesting vehicle 102 may provide software, firmware and/or hardware to facilitate data input and output between the components of the vehicle computing device 202 and other components, networks and data sources. Further, the communication interface 214 may facilitate communication with a display 218 (e.g., head unit display, head up display, dash board display) in the requesting vehicle 102 and other input/output devices 220, for example, a portable device 222 (e.g., key fob, smart phone) connected to the requesting vehicle 102.

In some embodiments the portable device 222 may include some or all of the components and functionality of the vehicle computing device 202. Additionally, the communication interface 214 may facilitate communication between the requesting vehicle 102 and the portable device 222 that may include a display and/or input/output devices (not shown) be used to operate various functions of the requesting vehicle 102. In one embodiment, the display 218 of the requesting vehicle 102 and/or the portable device 222 (e.g., through a display screen of the portable device 222) may be utilized to provide one or more user interfaces that may be included as a human machine interface(s) of the charge application 118.

Figure 3:
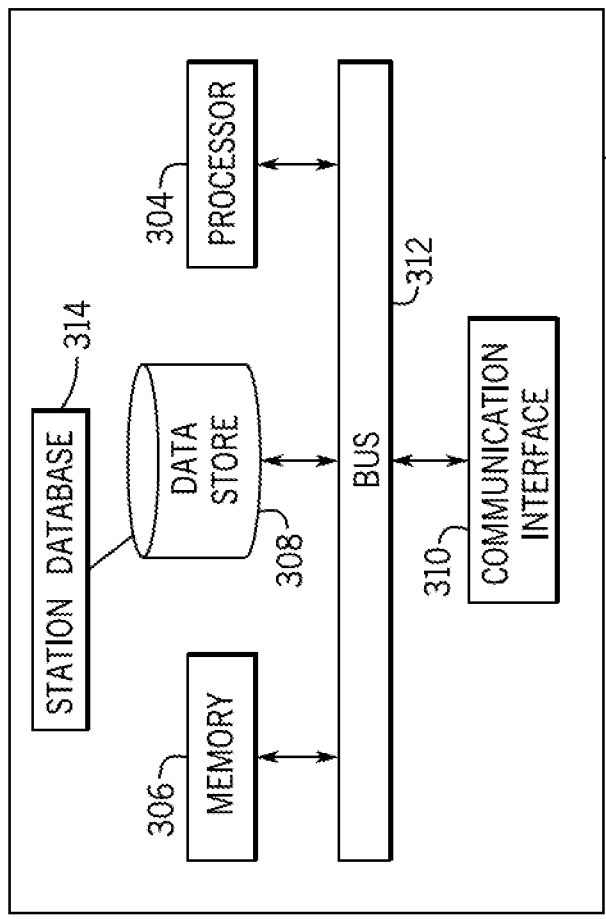
FIG. 3 is a schematic view of an illustrative remote server architecture according to an exemplary embodiment of the present disclosure.

Referring now to FIG. 3, a schematic view of an illustrative remote server architecture 300, for example the remote server 108 of FIG. 1, is shown according to an exemplary embodiment. The remote server 108, is located remotely (i.e., off-board) from the requesting vehicle 102 (as shown in FIG. 1). In some embodiments, the remote server 108 may be maintained by the charging entity 116, such as an Original Equipment Manufacturer (OEM) (e.g., of the requesting vehicle 102), a utility provider, a regulatory body, among others. In additional embodiments, the remote server 108 may be another type of remote device or supported by a cloud architecture. In FIG. 3, the remote server 108 may include a computing device 302 that may further include a processor 304, a memory 306, a data store 308 and a communication interface 310. The components of the architecture 300, including the computing device 302, may be operably connected for computer communication via a bus 312 and/or other wired and wireless technologies. The computing device 302 as well as the remote server 108 may include other components and systems not shown.

The data store 308 may store application data that may also include data pertaining to the charge application 118. In one configuration, the data store 308 may include a customer dataset (not shown) that may include data pertaining to users of electric vehicles (including the user of the requesting vehicle 102) that may utilize the charging stations 112. In one configuration, the customer dataset may include a charging schedule that may be associated with the requesting vehicle 102 utilized by the user. As discussed below, the charge application 118 may allow the user and/or the charging entity 116 to update the charging schedule associated with the requesting vehicle 102 that may utilize one or more charging stations 112. Additionally, the customer dataset may include a subjective customer rating (e.g., 1-10 value) that may be applicable to the users of electric vehicles as determined by the charge application 118 and/or one or more charging station entities that may be provided based on one or more factors.

The data store 308 of the remote server 108 may include a charging entity database 314 that may include respective records of charging stations 112 that may be owned and/or operated by the charging entities 116. The charging entity database 314 may include records that each pertain to particular charging stations 112 that include data that may be pre-updated and/or updated in real-time by one or more charging station entities. In one configuration, the charging entity database 314 may include records that may pertain to particular charging stations 112 and their respective geo-locations (e.g., GPS coordinates of the charging stations 112), charging data regarding previous and/or current charging sessions, and maintenance records and/or maintenance schedules for a charging station, among others. The charging entity database 314 may also include information about the charging entity 116 such as reservation schedules, previous occupancy data, electrical usage, average charging speeds, etc.

The charging entity database 314 may also include records that may pertain to one or more particular charging stations 112 and one or more pricing schemes that may be implemented by the respective charging stations 112. The one or more pricing schemes may include a price per kWh that may include a dynamic value that may change over time based on a time of day, a season, a region, a time zone, charging power requirements, a charging speed, charging queue place, etc.

For example, the charging speed of the charging stations 112 may be variable based on environmental factors, such as weather, as well as demand. In some embodiments, the charging entity database 314 may also include records that pertain to particular charging stations 112 and current utilization of the charging stations 112, such as the charging speed that the a charging station 112 has historically provided given the environmental factors and the charging speed the charging station 112 is currently providing to a charging vehicle 120. The current utilization of the charging stations 112 may pertain to wait times that may be applicable with respect to the charging of the requesting vehicle 102.

In one configuration, the communication interface 310 may provide software, firmware and/or hardware to facilitate data input and output between the components of the computing device 302 and other components, networks and data sources. In some embodiments, the communication interface 310 may be used to communicate with the requesting vehicle 102, the charging stations 112, the portable device 222, and/or other components of system 100 and architecture 200.

II. The Charge Application and Related Methods

The charge application 118 and its components will now be discussed in more detail according to an exemplary embodiment and with continued reference to FIGS. 1-3. In one or more embodiments, the charge application 118 may be executed by the vehicle computing device 202 of the requesting vehicle 102 and/or the computing device 302 of the remote server 108. In an alternate embodiment, the charge application 118 may be executed by a processor (not shown) of the portable device 222 that may be used by the user of the requesting vehicle 102.

In one or more configurations, data may be sent or received from the charge application 118 to the components of the requesting vehicle 102, the remote server 108, the charging stations 112, the charging link 114, and/or the portable device 222. For example, commands from the charge application 118 may be sent to the charging stations 112 and/or the charging link 114 to determine whether a charging station 112 is occupied or free. For example, the charge application 118 may receive signals regarding the occupancy such as an occupied signal or free signal.

In an exemplary embodiment, the charge application 118 may include one or more user input interfaces and/or input means (e.g., buttons) that may be presented via the display 218, presented via the portable device 222, and or included within the requesting vehicle 102 and/or on the portable device 222. In one embodiment, the one or more user input interfaces and/or input means may include user interface inputs that may be utilized by an individual (e.g., the user of the requesting vehicle 102) to enable or disable the presentation of one or more user interface graphics that may be presented by the charge application 118. Additionally, the one or more user input interfaces and/or input means may include user interface inputs that may be utilized by an individual to enable or disable one or more smart charging functions provided by the charge application 118.

As discussed above, the charge application 118 may be configured to provide one or more user interfaces to the user of the requesting vehicle 102 and users of additional electric vehicles, such as the charging vehicle 120. The one or more user interfaces may provide the user with information to the user so can make an informed choice based on occupancy status. For example, the one or more user interfaces allow the user to visually compare charging speeds, charging rates, charging infrastructure, charging queues, and/or additional charging related information that may pertain to various charging stations 112 that may be located within a particular vicinity of a current (e.g., real-time) geo-location of the requesting vehicle 102, a perspective (e.g., predicted) geo-location(s) of the requesting vehicle 102, and/or a dynamically based determined geo-location(s) that may be based on one or more factors associated with the requesting vehicle 102.

Figure 4:
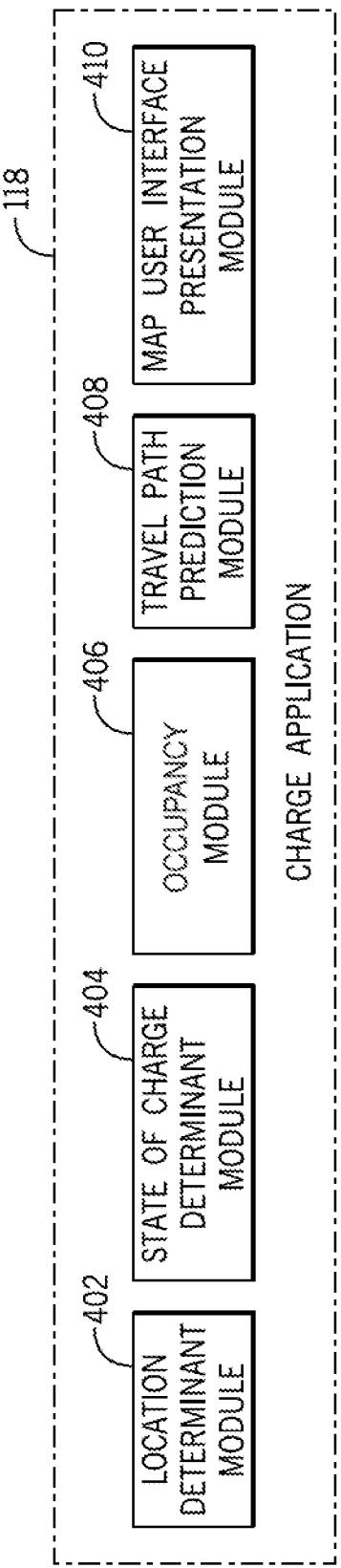
FIG. 4 is a schematic view of a plurality of modules of a smart charge application that may execute computer-implemented instructions for presenting electric vehicle charging options according to an exemplary embodiment of the present disclosure.

FIG. 4 is a schematic view of a plurality of modules 402-410 of the charge application 118 that may execute computer-implemented instructions for presenting the requesting vehicle 102 charging options for charging speeds based on the occupancy of one or more charging entities, such as charging entity 116. In an exemplary embodiment, the plurality of modules 402-410 may include a location determinant module 402, a state of charge (SOC) determinant module 404, an occupancy module 406, a travel path prediction module 408, and a map user interface presentation module 410. It is appreciated that the charge application 118 may include one or more additional modules and/or sub-modules that are included in lieu of the modules 402-410.

In one or more configurations, the location determinant module 402 of the charge application 118 may be configured to determine the current geo-location of the requesting vehicle 102 (e.g., current GPS/DGPS coordinates of the requesting vehicle 102). In particular, the location determinant module 402 may be configured to communicate with the GPS 210 of the requesting vehicle 102 to determine the current geo-location of the requesting vehicle 102 at one or more points in time. In some embodiments, the location determinant module 402 may be configured to store the one or more geo-locations of the requesting vehicle 102 determined at one or more points in time within the data store 208 of the vehicle computing device 202 and/or the data store 308 of the remote server 108.

The location module 402 may additionally determine the arrival time of the requesting vehicle 102 at various locations based on the current location of the requesting vehicle 102 as well as other vehicle information including, for example, previous locations of the requesting vehicle 102. For example, by tracking various locations of the requesting vehicle 102 at known times, location module 402 may determine the speed, direction, and planned path, among other kinematic characteristics of the requesting vehicle 102. In another embodiment, the location module 402 may estimate an arrival time based on the location log 224.

The SOC determinant module 404 may be configured to determine a current state of charge (SOC) of the battery 106 of the requesting vehicle 102. In one configuration, the SOC determinant module 404 may be configured to communicate with the processor 204 of the vehicle computing device 202 to determine the current SOC of the battery 106 of the requesting vehicle 102. In one embodiment, the processor 204 may be configured to communicate with a microprocessor (not shown) that may be included as part of electrical circuitry of the battery 106 to determine a current SOC of the battery 106.

The occupancy module 406 performs multiple operations which will be described as three stages, namely, (A) charging entity identification, (B) occupancy status determination, and (C) charging speed estimation. For simplicity, the operations will be described by these stages, but it is understood that the occupancy module 406 and corresponding elements of the described methods, such as the method 600, can be organized into different architectures, blocks, stages, and/or processes.

A. Charging Entity Identification

The occupancy module 406 identifies a plurality of charging entities 116. The occupancy module 406 may identify a plurality of charging entities 116 that are within a remaining distance that the requesting vehicle 102 is capable of traveling based on the current geo-location of the requesting vehicle 102 and the current SOC of the battery 106 of the requesting vehicle 120. In one or more embodiments, upon determining one or more geo-locations of the requesting vehicle 102, the location determinant module 402 may be configured to communicate respective data to the occupancy module 406. For example, upon receiving location data pertaining to a current geo-location of the requesting vehicle 102, the occupancy module 406 may be configured to determine geo-locations of one or more charging entities 116 located within a predetermined distance (e.g. 5 miles in one or more directions) of the current geo-location of the requesting vehicle 102.

The occupancy module 406 may be configured to access the charging entity database 314 stored upon the data store 308 of the remote server 108. As discussed, the charging entity database 314 may include records that each pertain to particular charging entities 116 that include data that may be pre-updated and/or updated in real-time by the one or more charging entities 116. Such records may pertain to particular charging entities, such as charging entity 116 having charging stations 112a-f and their respective geo-locations. Accordingly, the occupancy module 406 may be configured to access and query the charging entity database 314 to determine one or more charging entities 116 that may be located within a predetermined distance (e.g., 5 miles) of the current geo-location of the requesting vehicle 102 or within a predetermined distance of a type of amenity or selected point of interest location.

The SOC determinant module 404 may be configured to determine the SOC of the battery 106 of the requesting vehicle 102 at one or more points in time based on communication with the processor 204 of the vehicle computing device 202 of the requesting vehicle 102. The SOC determinant module 404 may be additionally configured to analyze the current geo-location of the requesting vehicle 102 and determine a remaining distance that the requesting vehicle 102 is capable of traveling. The remaining distance may be determined based on analyzing the current SOC of the battery 106, an average speed of the requesting vehicle 102, and/or one or more road types (e.g., local, highway, road grades) that may be located within a vicinity of the current geo-location of the requesting vehicle 102. The SOC determinant module 404 may communicate respective data to the occupancy module 406.

In one embodiment, the occupancy module 406 may be configured to analyze the current geo-location of the requesting vehicle 102 as determined and communicated by the location determinant module 402 in addition to the current SOC and remaining distance that the requesting vehicle 102 may travel as determined and communicated by the SOC determinant module 404. The occupancy module 406 may thereby be configured to determine one or more charging entities 116 that may be located within a remaining distance that the requesting vehicle 102 is able to reach based the charging station(s) on the current geo-location of the requesting vehicle 102, the current SOC of the battery 106 of the requesting vehicle 102, and/or one or more road types (e.g., local, highway, road grades) that may be located within a vicinity of the current geo-location of the requesting vehicle 102. For example, upon receiving data pertaining to a current geo-location of the requesting vehicle 102, the occupancy module 406 may identify a plurality of charging entities 116 that are within a remaining distance that the requesting vehicle 102 is capable of traveling based on the current SOC of the requesting vehicle 102. In this manner, the occupancy module may use information from the location determinant module 402 and/or the SOC determinant module 404.

In an exemplary embodiment, the travel path prediction module 408 of the charge application 118 may be configured to predict one or more perspective travel paths of the requesting vehicle 102 based on the determination and analysis of one or more travel routines that may be followed by the user of the requesting vehicle 102. As discussed above, the location log 224 stored on the data store 208 of the vehicle computing device 202 may include a log of locations at which the requesting vehicle 102 is driven, parked, and/or charged. In one configuration, the travel path prediction module 408 may analyze the location log 224 to determine one or more point of interest locations that may be frequently and/or routinely traveled to by the requesting vehicle 102. In particular, the travel path prediction module 408 may analyze point of interest data (not shown) that may be stored on the data store 208 of the vehicle computing device 202 and/or the data store 308 of the remote server 108 to determine one or more points of interest locations that may be frequently and/or routinely traveled to by the requesting vehicle 102.

Upon analyzing the location log 224, the travel path prediction module 408 may be configured to determine one or more travel routines that may be followed by the user of the requesting vehicle 102. In some configurations, the one or more travel routines may be analyzed through a neural network (not shown) to provide computer/machine based/ deep learning techniques to determine whether a particular trip of the requesting vehicle 102 is a routine trip or non-routine trip based on the analysis of data provided by the GPS 210.

The travel path prediction module 408 may analyze the current geo-location of the requesting vehicle 102 at one or more points in time with respect a particular timeframe of utilization of the requesting vehicle 102 and one or more routine trips that may be determined to thereby predict one or more perspective travel routes that may be utilized by the requesting vehicle 102 to reach one or more points of interest locations that may be frequently and/or routinely traveled to by the requesting vehicle 102. Thus, the travel path prediction module 408 may communicate data pertaining to the perspective travel routes to the occupancy module 406. In one embodiment, upon receiving data pertaining to one or more perspective travel routes of the requesting vehicle 102, the occupancy module 406 may be configured to access and query the charging entity database 314 to determine one or more charging stations 112 that may be located within a predetermined distance of one or more perspective travel paths that are predicted to be utilized by the requesting vehicle 102 based on one or more travel routines of the user of the requesting vehicle 102.

In one embodiment, the travel path prediction module 408 may be configured to communicate one or more perspective travel paths that are predicted to be utilized by the requesting vehicle 102 to the SOC determinant module 404. The SOC determinant module 404 may be configured to analyze the current SOC of the battery 106 of the requesting vehicle 102 and the one or more perspective travel paths to predict one or more perspective SOC levels of the battery 106 during perspective travel of the requesting vehicle 102. The one or more perspective SOC levels of the battery 106 may be based on the current SOC of the battery 106, an average speed of the requesting vehicle 102, and/or one or more road types (e.g., local, highway, road grades) of the one or more perspective travel paths of the requesting vehicle 102 as predicted by the travel path prediction module 408. Upon determining the perspective SOC levels of the battery 106, the SOC determinant module 404 may communicate data pertaining to the one or more perspective travel paths of the requesting vehicle 102 and the one or more associated perspective SOC levels of the battery 106 to the occupancy module 406.

The occupancy module 406 may be configured to analyze the one or more perspective travel paths of the requesting vehicle 102 and the associated perspective SOC levels of the battery 106 of the requesting vehicle 102. The occupancy module 406 may thereby access and query the charging entity database 314 to determine one or more charging entities 116 that may be located within a distance that the requesting vehicle 102 may travel to reach based on the one or more perspective travel paths of the requesting vehicle 102 and the associated perspective SOC level(s) of the battery 106 of the requesting vehicle 102. Accordingly, the occupancy module 406 may determine one or more charging entities 116 that may be located on or within a predetermined distance of one or more perspective travel paths of the requesting vehicle 102 and that may be located within a distance that is reachable by the requesting vehicle 102 based on associated perspective SOC levels of the battery 106. As discussed above, the occupancy module 406 may be configured to communicate data determined by the module 406 to the map user interface presentation module 410 of the charge application 118.

B. Occupancy Status Determination

The occupancy module 406 is further configured determine occupancy statuses for one or more charging entities 116 of the plurality of charging entities 116. The occupancy status indicates a number of the one or more charging stations 112 of the charging entity 116 that are occupied. The occupancy status may be determined for each charging station 112 of a charging entity 116 as a binary determination as occupied or available. As will be discussed below, occupancy may be determined based on a charging vehicle 120 currently charging, a charging vehicle 120 planning to charge based on a charging reservation, and/or a requesting vehicle 102 being prevented from charging at a charging station 112, for example based on a position of the charging vehicle 120.

As discussed above, the occupancy module 406 may access the charging entity database 314 stored upon the data store 308 of the remote server 108. The charging entity database 314 may include records that each pertain to particular charging entities 116. The records may include occupancy data about the number of charging stations 112 that are currently occupied. The occupancy data may be pre-updated and/or updated in real-time by the one or more charging entities 116. The occupancy data may include the number charging stations 112 that are engaged with vehicles, such as the charging vehicle 120. For example, the charging vehicle 120 may be engaged with a charging station 112 when the charging vehicle 120 has a charging link 114 with a charging station 112 and is currently being charged. In another embodiment, the charging vehicle 120 may occupy a charging station 112 when the charging vehicle 120 has a reservation with the charging entity 116 or at a particular charging station 112, such as the charging station 112a.

For example, the charging data may indicate that the charging entity 116 includes six charging stations 112: charging station 112a, charging station 112b, charging station 112c, charging station 112d, charging station 112e, and charging station 112f. The charging station 112a, 112b, and 112c may be engaged with charging vehicles, such as the charging vehicle 120, via a charging link 114 that is wired. Accordingly, the occupancy module 406 may determine that the charging stations 112a, 112b, and 112c of the charging entity 116 are occupied. In one embodiment, the charging link 114 of a charging station 112 may cause a processor, such as the processor 304, to transmit a signal indicative of the occupancy of a charging station 112. For example, the occupancy module 406 may receive an occupied signal when a charging station 112 is occupied or a free signal for each charging station 112 associated with the charging entity 116 that is available. Continuing the example from above, the occupancy module 406 may receive an occupied signal from the charging stations 112a, 112b, and 112c of the charging entity 116, and a free signal from charging stations 112d, 112e, and 112f of the charging entity 116.

In another embodiment, the charging stations 112 and/or the charging entity 116 may be associated with charging sensors that detect the presence of a charging vehicle 120 at a charging station 112. For example, suppose the charging station 112a provided a charge to the charging vehicle 120 but has since completed a charge. Despite the charging station 112a no longer providing the charging vehicle 120 with a charge, the charging vehicle 120 may still located in a space thereby preventing another vehicle from receiving a charge from the charging station 112a. Thus, regardless of whether the charging vehicle 120 is charging, the occupancy of the charging station 112a may be determined based on the position of the charging vehicle 120.

Even if the charging link 114 with the charging vehicle 120 has been terminated, the occupancy module 406 may determine that the charging station 112a is still occupied. For example, the occupancy module 406 may receive sensor data from one or more station systems of a charging station 112, such as sensory system (e.g., light detection and ranging (LIDAR) system, camera system (having one or more cameras and/or optical sensors), etc.) capable of receiving sensor data regarding the charging entity. The sensor data may indicate that the charging vehicle 120 is currently blocking access to the charging station 112. The occupancy module 406 may determine that a charging station 112 that is prevented from providing a charge to the requesting vehicle 102 is occupied and the occupancy module 406 would receive an occupied signal associated with that charging station 112.

Furthermore, the charging station 112d may not be currently charging the charging vehicle 120 but have a pending reservation that is scheduled to begin before the requesting vehicle 102 is estimated to arrive at the charging entity 116. Therefore, the occupancy module 406 may determine that the charging stations 112d of the entity 116 is occupied relative to the requesting vehicle 102. In some embodiments, the reservation of a charging vehicle 120 may result in a charging window of time that the charging station 112d is expected to be providing a charge to the charging vehicle 120. During the charging window, the occupancy module 406 may determine that the charging stations 112d of the entity 116 is occupied and therefore, the charging station 112 would be associated with an occupied signal for the timeframe corresponding to the reservation even if not currently providing a charge. Accordingly, the occupancy module 406 may determine occupancy status based on prospective or scheduled charging such the occupancy of a charging entity 116 is based on the estimated time of arrival of the requesting vehicle 102 at the charging entity 116.

The occupancy module 406 may determine that a charging station is occupied based on reservations of the charging vehicle 120 and the estimated time of arrival of the requesting vehicle 102. The estimated time of arrival of the requesting vehicle 102 may be determined based on the current geo-location of the requesting vehicle 102 as determined by the location determinant module 402. Additionally, in response to determining that the charging vehicle 120 has a reservation at the charging entity, the occupancy module 406 may request location data from the charging vehicle 120 to determine an estimated time of arrival of the charging vehicle 120 at the charging entity 116. Therefore, the determination of occupancy may be based on location data for the charging vehicle 120.

Although described with respect to the one charging entity 116 for clarity, the occupancy module 406 makes similar determinations for the plurality of charging entities that the occupancy module 406 has identified. For example, the occupancy module 406 may determine the occupancy status of each charging station within a remaining distance of the requesting vehicle 102. Therefore, the occupancy module 406 determines occupancy statuses for one or more charging entities of the plurality of charging entities 116.

Continuing the example from above, suppose the charging entity includes charging stations 112a, 112b, 112c, 112d, 112e, and 112f and that the occupancy module 406 has determined that the charging stations 112a, 112b, 112c, and 112d are occupied. The occupancy module 406 may determine the occupancy status as a ratio of the number of the one or more charging stations of the charging entity 116 that are occupied to the total number of charging stations of the charging entity 116. Thus, the charging entity 116 may have an occupancy status of 67% occupied.

In another embodiment, the occupancy status may be a total number of occupied charging stations, therefore in this example, the occupancy status of the charging entity 116 would be four. The charging status may additionally be a category associated with a threshold occupancy. For example, suppose that the charging entity 116 is deemed "Free" if the ratio of occupied charging stations to the total number of charging stations is at or under 33%, that the charging entity 116 is deemed "Busy" if the ratio of occupied charging stations to the total number of charging stations is between 34% and 66%, and that the charging entity 116 is deemed "Full" if the ratio of occupied charging stations to the total number of charging stations is at or over 67%. Then given the example from above in which the charging stations 112a, 112b, 112c, and 112d are occupied, the occupancy status of the charging entity 116 is "Full." In this manner the occupancy status may be a category and/or value.

C. Charging Speed Estimation

The occupancy module 406 estimates charging speeds for the one or more charging entities 116 based on the occupancy statuses. The higher the occupancy of the charging entity 116, the lower the occupancy module 406 may estimate the charging speed of a charging station 112 to be. For example, the charging entity 116 may be associated at least one default charging speed such as a standard charge speed and/or a fast charge speed based on the fast charging components of the charging station. The occupancy module 406 may access a look-up table on the data store 308 to determine an estimated charging speed based on the occupancy status. For example, when a charging entity 116 is "Full" the default charging speed may be adjusted by a predetermined amount.

In one embodiment, estimating the charging speeds may include applying an occupancy factor to the at least one default charging speed based on the occupancy status of the charging entity 116. Because more charging stations 112 being occupied may slow down the default charging speed for the charging entity 116, the occupancy factor may be inversely related to the occupancy status of the charging entity 116. Accordingly, the higher the occupancy status, the occupancy factor is applied to reduce the charging speed. For example, suppose the occupancy status is 67%, the occupancy factor may be equal to 1-0.67 or 0.33. The occupancy factor may be 0.33 applied to the default charging speed. Suppose that the standard charging speed is 90 kW and the fast charging speed is 250 kW, the estimated charging speeds would be 30 kW and 75 kW, respectively.

The occupancy module 406 may access an occupancy factor on the data store 308. For example, the occupancy factor may be calculated for a specific charging station based on historical data related to previous charging stations.

In some embodiments, different default charging speeds may have different occupancy factors. For example, fast charging speeds may be more sensitive to higher occupancy. Suppose that the occupancy status is 67% such that occupancy factor is 0.33, and that the charging speed is 90 kW and the fast charging speed is 250 kW. The occupancy factor may be twice the occupancy status ratio for the standard charging speed and the occupancy status ratio for the fast charging speed. Accordingly, the estimated charging speed may be the estimated charging speeds would be 60 kW and 75 kW, respectively.

In an exemplary embodiment, the map user interface presentation module 410 of the charge application 118 may be configured to present one or more charging station map user interfaces that present data determined and/or predicted by the modules 402-410, as discussed above. In particular, the charging station map interface(s) may include a map that may pin point a current geo-location of the requesting vehicle 102, a perspective geo-location of the requesting vehicle 102 on one or more perspective travel paths of the requesting vehicle 102, a type of amenity, and/or a selected point of interest.

Figure 5:
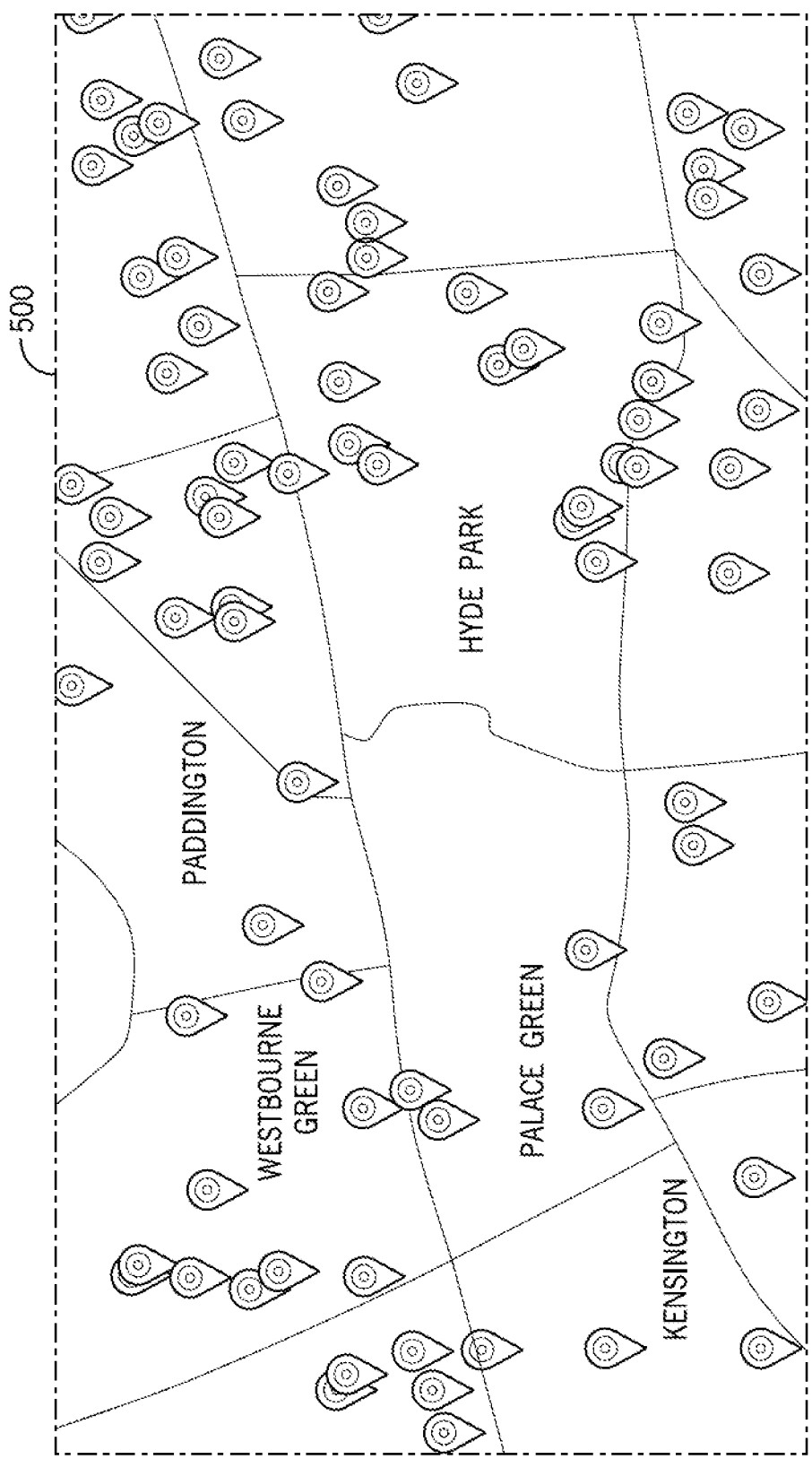
FIG. 5 is an illustrative example of a charging station map user interface according to an exemplary embodiment of the present disclosure.

As shown in FIG. 5, an illustrative example of a charging entity map user interface 500 according to an exemplary embodiment of the present disclosure, the charging entity map user interface 500 may be presented with pin points that are associated with respective charging entities 116. The charging entity map user interface 500 may be presented through the display 218 of the requesting vehicle 102 and/or a display of the portable device 222. As discussed below, the map user interface presentation module 410 may present the charging entity map user interface 500 to pin point a current geo-location of the requesting vehicle 102, one or more perspective geo-locations of the requesting vehicle 102, and the geo-location(s) of one or more charging entities 116 that may be located within the predetermined distance of the requesting vehicle 102, within a predetermined distance of one or more perspective pathways of the requesting vehicle 102, near one or more points of interest at which one or more routine activities may take place, and/or at one or more locations at which the requesting vehicle 102 may need to be charged to maintain a sufficient SOC to be utilized complete one or more remaining routine activities and/or non-routine activities.

In one embodiment, the charging entity map user interface 500 may be presented in two-dimensional format (as shown in FIG. 5). In additional embodiments, the charging entity map user interface 500 may be converted to a three-dimensional format, a street-view format, a first-person point of view format, a satellite view format, and the like based on the receipt of a respective user interface input.

The charging entity map user interface 500 may be selectively enabled or disabled based on the receipt of a respective user interface input. In some configurations, the charging entity map user interface 500 may be enabled based on a predetermined SOC level of the battery 106 of the requesting vehicle 102 (e.g., 30% remaining SOC) and/or a user-based enablement setting that may be associated with the geo-location of the requesting vehicle 102 and/or a particular timeframe (e.g., particular day of the week). Upon enablement, the charging entity map user interface 500 may be initially presented in a format that may show an area that may be included within a predetermined distance or user selected distance of the geo-location of the requesting vehicle 102. The charging entity map user interface 500 may be configured to be zoomed in or zoomed out to show a smaller area or larger area based on the adjustment of the distance of the geo-location of the requesting vehicle 102 that is to be presented. Accordingly, the user of the requesting vehicle 102 may be able to view data associated with one or more charging entities 116 that may be located at a variable distance from the current geo-location of the requesting vehicle 102 and/or one or more perspective travel paths of the requesting vehicle 102.

In one embodiment, the user may selectively input one or more charging stations 112 and/or charging entities 116 that own and/or operate particular charging entities 116 as favorites. Such favorites may be shown as highlighted or accompanied with a user interface graphic (e.g., star) that may allow the user to easily identify them on the charging entity map user interface 500. Additionally, the user may selectively input one or more charging stations 112 and/or charging entities 116 that own and/or operate particular charging entities 116 as prohibited, disallowed, or indicated as undesirable. Such charging stations 112 and/or charging entities 116 that are owned and/or operated by prohibited charging station entities 116 may not be pin pointed on the charging entity map user interface 500.

The user may selectively input threshold preferences related to price schemes, queue/wait times, price incentives, charging types, and the like that may be utilized to pin point one or more charging entities 116 on the charging entity map user interface 500. For example, the user may choose a threshold charging speed to highlight charging entities 116 that are capable of providing at least the threshold charging speed. Accordingly, the charging entity map user interface 500 may be selectively customized to pin point one or more charging entities 116 that may apply with respect to the threshold preferences. The one or more charging entities 116 may be shown as highlighted or accompanied with a user interface graphic (e.g., clock symbol) that may allow the user to easily identify them on the charging entity map user interface 500. In other embodiments, one or more charging entities 116 that may not apply with respect to the threshold preferences may be selectively hidden based on a user interface input received by the user. One or more charging entities 116 may be pin pointed, highlighted, accompanied with user interface graphics, and/or hidden based on user interface inputs that may be associated with various user preferences.

Specific embodiments of the presentation of the map user interface(s) will now be described. With continued reference to FIG. 1, in one embodiment, the map user interface presentation module 410 may present the charging station map interface(s) as a map that may additionally pin point one or more charging entities 116 that may be determined to be within the (default) predetermined distance of the requesting vehicle 102, as determined by the occupancy module 406. In another embodiment, the charging station map interface(s) may also or alternatively pin point one or more charging entities 116 that may be determined to be located within a distance that the requesting vehicle 102 may travel to reach the charging entities 116 based on the current geo-location of the requesting vehicle 102, the current SOC of the battery 106 of the requesting vehicle 102, and/or one or more road types that may be located within a vicinity of the current geo-location of the requesting vehicle 102.

In some embodiments, the charging station map interface(s) may pin point one or more charging entities 116 that may be located within a predetermined distance of one or more perspective travel paths that are predicted to be utilized by the requesting vehicle 102 based on one or more travel routines of the user of the requesting vehicle 102, as determined by the occupancy module 406. In additional embodiments, the charging station map interface(s) may additionally or alternatively pin point one or more charging entities 116 that may be located on or near one or more perspective travel paths of the requesting vehicle 102 as predicted by the travel path prediction module 408 and that may be located within a distance that is reachable by the requesting vehicle 102 based on associated perspective SOC levels of the battery 106 as predicted by the SOC determinant module 404. In some embodiments, the charging station map interface(s) may pin point one or more charging entities 116 that may be located within a predetermined distance of one or more amenities.

In one embodiment, the map user interface presentation module 410 may be configured to communicate with the charging entity 116 to determine one or more price schemes that may be implemented by respective charging entities 116 that are presented as pin pointed. The map user interface presentation module 410 may be configured to present one or more price schemes and/or a summary of pricing that may be applicable to each of the respective charging entities 116 that are presented as pin pointed. The one or more charging entities 116 may be presented with an estimated cost to charge the requesting vehicle 102 based on a current or perspective SOC of the requesting vehicle 102 at one or more charging entities 116 based on respective price schemes. In some configurations, the map user interface presentation module 410 may be configured to present one or more user interface input links that may be inputted by the user of the requesting vehicle 102 to determine additional pricing information and/or trends that may be applicable to the respective charging entities 116.

In another embodiment, the map user interface presentation module 410 may be configured to communicate with the charging entity 116 to determine one or more queues/wait times (e.g., queues of electric vehicles to be charged) that are associated with respective charging stations 112. The one or more queues may be analyzed to determine respective wait times to charge the requesting vehicle 102 if the requesting vehicle 102 were to be added to a respective queue(s). Accordingly, the charge application 118 may present the charging station map user interface that includes a map that may pin point one or more charging stations 112 that include queue and wait time details that may pertain to each of the respective charging stations 112. In one configuration, the charge application 118 may present a user interface input that may be associated to each of the one or more charging stations 112 that may be selected by the user to add or remove the requesting vehicle 102 from a queue of a respective charging stations 112. Accordingly, the charging station map user interface(s) may be utilized by the user to schedule the charging of the requesting vehicle 102 at one or more charging stations(s) 112 at one or more points in time.

In some configurations, the map user interface presentation module 410 may be configured to communicate with the charging entity 116 to determine one or more charging stations 112 that may be equipped to provide fast charging capabilities. The map user interface presentation module 410 may be configured to present one or more of the charging stations 112 that may be equipped to provide fast charging capabilities as pin pointed on the charging station map user interface. The charging station map user interface may be presented with respective user interface inputs that may be selected to add the requesting vehicle 102 to a queue of one or more charging entities 116 that may be configured to provide fast charging capabilities to fast charge the requesting vehicle 102.

In one embodiment, the map user interface presentation module 410 may be configured to communicate with the charging entity 116 to receive incentive pricing schemes that may be provided by one or more the charging entities 116 and/or one or more particular charging stations 112. In another embodiment, the map user interface presentation module 410 may communicate with remote server 108 to receive incentive pricing schemes that may be stored within the charging entity database 314 that may include records that each pertain to particular charging stations 112 and/or charging station entities as populated by one or more charging station entities 116.

In some configurations, the map user interface presentation module 410 may also present the charging station map user interface that may include a map that may pin point a current geo-location of the requesting vehicle 102, one or more perspective geo-locations of the requesting vehicle 102, and the geo-location(s) of one or more charging stations 112 that may be located within the predetermined distance of the requesting vehicle 102, near one or more perspective pathways of the requesting vehicle 102, near one or more points of interest at which one or more routine activities may take place, and/or at one or more locations at which the requesting vehicle 102 may need to be charged to maintain a sufficient SOC to complete one or more remaining routine activities. The one or more charging entities 116 may be presented with an estimated cost to charge the requesting vehicle 102 based on a current or perspective SOC of the requesting vehicle 102 at one or more charging entities 116. Accordingly, certain attributes pertaining to a time of day, pricing schemes, retail based discounts, credits, and/or offers may be presented to the user through the charging station map user interface to provide details with respect to one or more charging entities 116 that may provide incentives to the user.

As discussed above, upon determining the respective geo-locations of the charging vehicle 120 the occupancy module 406 may be configured to analyze the current geo-location of the requesting vehicle 102 as determined based on communication received from the location determinant module 402. The occupancy module 406 may be configured to compare the current geo-location of the requesting vehicle 102 to the respective geo-locations of the charging vehicle 120 to determine one or more charging vehicles 120 that may be located within a predetermined distance of the requesting vehicle 102.

The map user interface presentation module 410 may thereby receive respective data from the occupancy module 406 and may present the charging station map user interface(s) with the one or more pin points that pin point the current geo-locations of one or more charging vehicles 120 that may be located within a predetermined distance of the requesting vehicle 102. The map user interface presentation module 410 may present a user interface input that may be associated to each of the one or more charging vehicles 120 that may be selected by the user to send and/or receive vehicle to vehicle communications with one or more charging vehicles 120 through the communication interface 214 of the vehicle computing device 202.

It is to be appreciated that the map user interface presentation module 410 may present the charging station map user interface(s) in a variety of formats that may be presented with graphics detailed within one or more of the aforementioned embodiments. Accordingly, the charging station map user interface(s) may be presented to provide various levels of information that may pertain to one or more charging stations 112 and/or charging entities 116 that may be potentially utilized to charge the requesting vehicle 102 in one or more manners. The presentation module 410 may present the charging station map user interface(s) with additional contemplated information that may be related to utility costs, electric charging costs, a price per kWh of charging power that may include a dynamic value that may change over time based on a time of day, a season, a region, a time zone, etc., additional queue/wait time information, charging station/charging entity 116 incentives, and/or additional information that may be presented to the user of the requesting vehicle 102. For simplicity, one charging vehicle 120 is described, however the systems and method described herein may pertain to a plurality of charging vehicles that operate in a similar manner as the charging vehicle 120.

Figure 6:
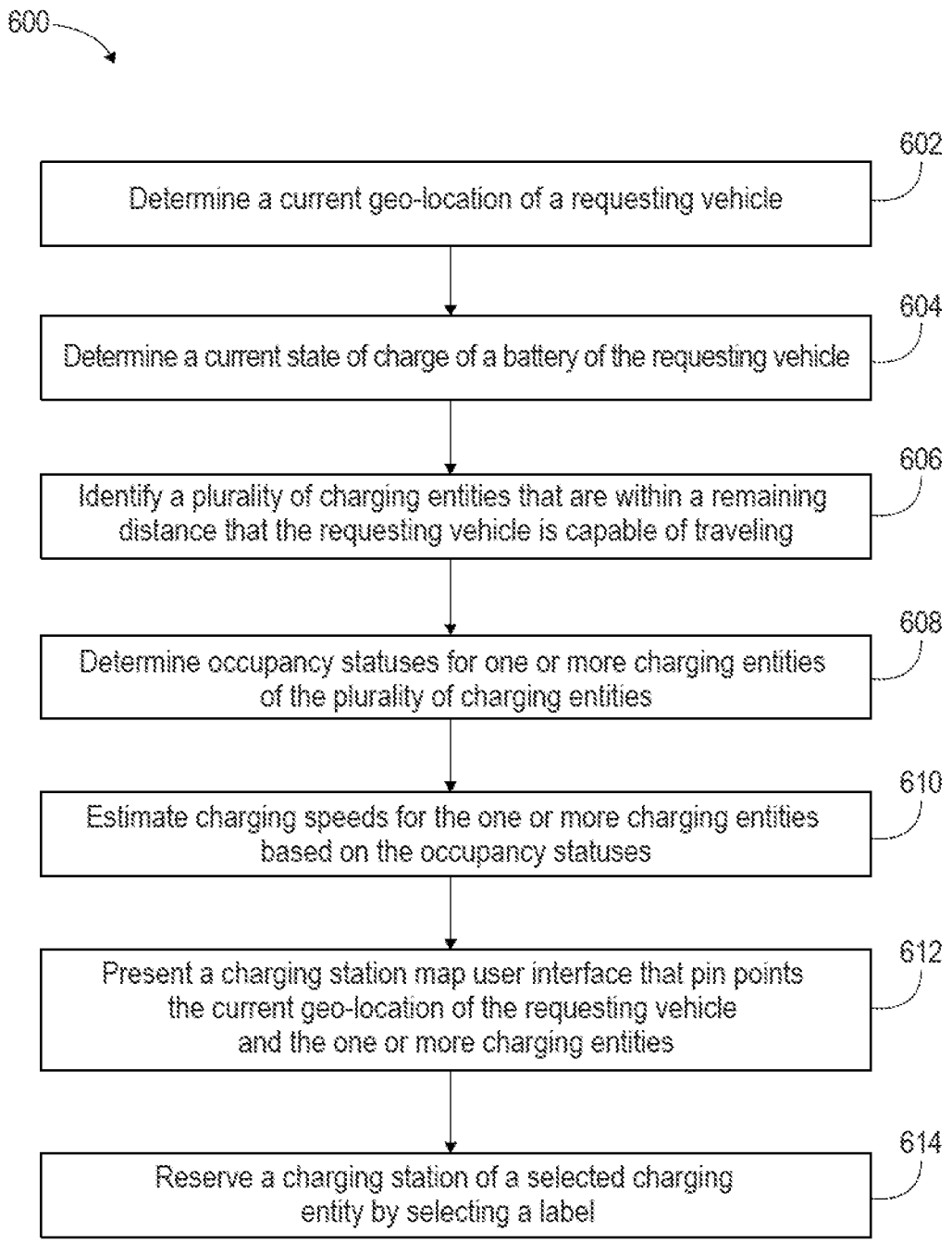
FIG. 6 is a process flow diagram of a method for presenting the charging station map user interface with one or more charging stations based on the current geo-location of an electric vehicle (EV) and the state of charge (SOC) of a battery of the EV according to an exemplary embodiment of the present disclosure.

FIG. 6 is a process flow diagram of a method 600 for estimating charging speeds based on the occupancy status of the one or more charging entities, according to an exemplary embodiment of the present disclosure. FIG. 6 will be described with reference to the components of FIG. 1, FIG. 2, FIG. 3, and FIG. 4, through it is to be appreciated that the method 600 of FIG. 6 may be used with additional and/or alternative system components.

The method 600 begins at block 602, wherein the method 600 includes determining the current geo-location of the requesting vehicle 102. In an exemplary embodiment, the location determinant module 402 may be configured to communicate with the GPS 210 of the requesting vehicle 102 to determine the current geo-location of the requesting vehicle 102 at one or more points in time. In some embodiments, the location determinant module 402 may be configured to store one or more geo-locations of the requesting vehicle 102 as determined at one or more points in time within the data store 208 of the vehicle computing device 202 and/or the data store 308 of the remote server 108.

At block 604, the method 600 includes the SOC determinant module 404 determining the SOC of the battery 106 of the requesting vehicle 102. In one configuration, the SOC determinant module 404 may be configured to communicate with the processor 204 of the vehicle computing device 202 to determine the current SOC of the battery 106 of the requesting vehicle 102. In one embodiment, the processor 204 may be configured to communicate with a micro-processor (not shown) that may be included as part of electrical circuitry of the battery 106 to determine a current SOC of the battery 106.

The SOC determinant module 404 may be additionally configured to analyze the current geo-location of the requesting vehicle 102 and determine a remaining distance that the requesting vehicle 102 is capable of traveling. The remaining distance may be determined based on analyzing the current SOC of the battery 106, an average speed of the requesting vehicle 102, and/or one or more road types (e.g., local, highway, road grades) that may be located within a vicinity of the current geo-location of the requesting vehicle 102. Upon determining the current SOC and remaining distance that the requesting vehicle 102 may travel at the average speed of the requesting vehicle 102, the SOC determinant module 404 may communicate respective data to the occupancy module 406.

At block 606, the method 600 includes identifying a plurality of charging entities 116 that are within a predetermined distance of the requesting vehicle 102. In one embodiment, upon receiving data pertaining to a current geo-location of the requesting vehicle 102. The occupancy module 406 may be configured to determine geo-locations of one or more charging entities 116 that may be located within the predetermined distance of the current geo-location of the requesting vehicle 102. In particular, the occupancy module 406 may be configured to access and query the charging entity database 314 to determine one or more charging entities 116 that may be located within the predetermined distance (e.g., 5 miles) or remaining distance of the current geo-location of the requesting vehicle 102. Upon determining the one or more charging entities 116 that may be located within the predetermined distance of the current geo-location of the requesting vehicle 102, the occupancy module 406 may communicate data pertaining to the one or more charging entities 116 to the map user interface presentation module 410 of the charge application 118.

The occupancy module 406 may be configured to access and query the charging entity database 314 to determine one or more charging stations 112 that may be located within a distance that the requesting vehicle 102 is capable of reaching based on the current geo-location of the requesting vehicle 102, the current SOC of the battery 106 of the requesting vehicle 102, and/or one or more road types (e.g., local, highway, road grades) that may be located within a vicinity of the current geo-location of the requesting vehicle 102. Upon determining the one or more charging stations 112 that may be located within a distance that the requesting vehicle 102 may travel based on the SOC of the battery 106 of the requesting vehicle 102, the occupancy module 406 may communicate data pertaining to the occupancy of the one more charging entities 116.

At block 608, the method 600 includes determining occupancy statuses for one or more charging entities 116 of the plurality of charging entities 116. For example, the occupancy status for each charging station 112 of the charging entity 116 may be either occupied or not occupied. A charging station 112 may be occupied when the charging station is providing charge to a charging vehicle 120, is scheduled to provide charge to a charging vehicle by the estimated time of arrival of the requesting vehicle 102, and/or the charging station 112 is prevented from providing a charge to the requesting vehicle 102.

The occupancy statuses for the one or more charging entities 116 may be determined in response to receiving an occupied signal or a free signal for charging station 112 associated with a charging entity 116. For example, the occupancy status may be calculated as a ratio of the number of the one or more charging stations 112 of the charging entity 116 that are occupied to the total number of charging stations 112 of the charging entity 116.

At block 610, the method 600 includes estimating charging speeds for the one or more charging entities based on the occupancy statuses. The charging speeds may be estimated using a look-up table, historical charging data, etc. that may be accessed via the charging entity database 314.

At block 612, the method 600 includes presenting a charging station map user interface with one or more charging entities 116. In one embodiment the map user interface presentation module 410 may present the charging station map interface through the display unit of the requesting vehicle 102 and/or through the display of the portable device 222. The charging station map interface may be presented as a map that may pin point one or more charging entities 116 that may be determined to be within the predetermined distance of the requesting vehicle 102, as determined by the occupancy module 406. Additionally, the charging station map interface may pin point one or more charging entities 116 that may be determined to be located within a distance that the requesting vehicle 102 may travel to reach the charging entities 116 based on the current geo-location of the requesting vehicle 102, the current SOC of the battery 106 of the requesting vehicle 102, and/or one or more road types that may be located within a vicinity of the current geo-location of the requesting vehicle 102.

At block 614, the method 600 includes reserving a charging station 112 of a selected charging entity 116 of the plurality of charging entities by selecting a label of the one or more charging entities that is presented on the charging station map user interface, as will be discussed below with respect to FIG. 7.

Figure 7:
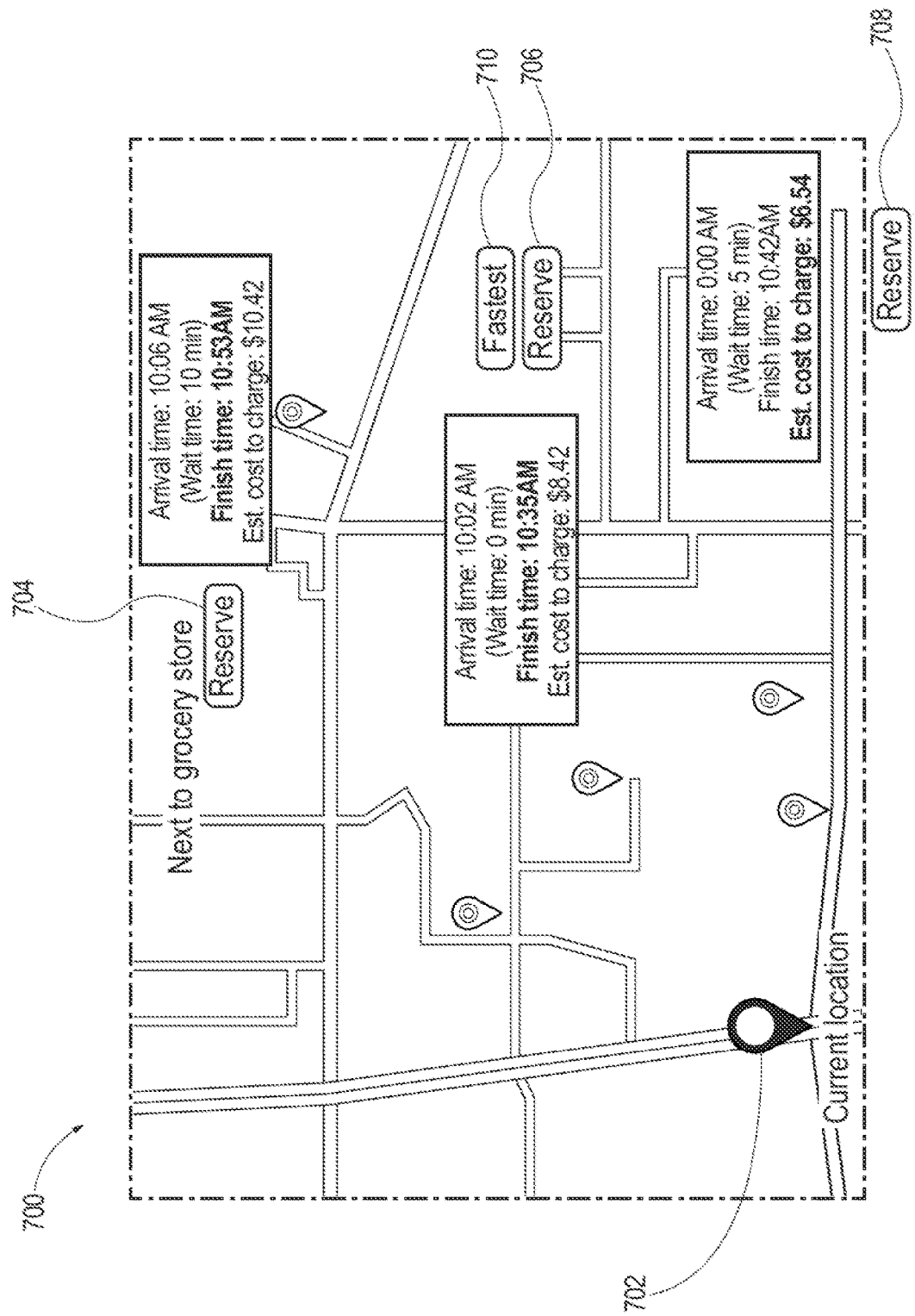
FIG. 7 is an illustrative example of a charging station map user interface for use with a user interface according to an exemplary embodiment of the present disclosure.

FIG. 7 is an illustrative example of a charging station map user interface 700 for use with a user interface according to an exemplary embodiment of the present disclosure. The charging station map user interface 700 is a charging station map user interface as described above. The charging station map user interface 700 may include user interface selectable geo-locations. Presenting a charging station map user interface that pin points the current geo-location 702 of the requesting vehicle 102 and each of the charging entities 116 of the plurality of charging entities 116 may include applying reservation selection inputs 704, 706, and 708, related charging information, and/or a label, such as the label 710. The reservation selection inputs 704, 706, and 708 allow a user to select an icon to reserve a time or position in a queue associated with a charging entity 116. The related information includes information about the charging entities 116, vehicles (e.g., the requesting vehicle 102, the charging vehicle 120, additional charging vehicles, etc.), environment, etc. The label 710 identifies a characteristic of a charging station, such as an amenity, feature, or location.

Labels define categories of amenities. The label 710 being applied to a charging station indicates that that the charging station has satisfied the conditions of the label 710. For example, the category of the label 710 may be based on the dynamic pricing scheme. Suppose that the label is "Cheaper" such that the condition of the label 710 is to only include those charging stations with a charge per kilowatt hour below a threshold value. Charging stations that satisfy the threshold value are annotated with the label "Cheaper." Furthermore, the label 710 of a plurality of labels may be tiered. For example, as an addition or alternative, the category based on the dynamic pricing scheme may include a label "Cheapest." The "Cheapest" may be applied to the charging station having the lowest pricing per kilowatt hour. In this manner, a single category may include multiple labels.

In some embodiments, the label 710 may be indicative of certain benefits such as lower pricing or faster charging can be provided during high renewable energy times. Therefore, in addition to the interface allowing the user to visually compare charging rates, charging infrastructure, charging queues, and/or additional charging related information that may pertain to various charging entities 116 relative to the current location 702 of the user or the requesting vehicle 102. The charge application 118 may annotate various charging entities 116 with labels that identify features of the various charging entities 116 that exist in the category. The reservation selection inputs may allow the user reserve a time and/or position in the queue for a charging entity 116 by selecting the reservation selection input.

For example, a charging entity 116 may be associated with a first reservation selection input 704 that identifies a particular amenity or category of amenity. The amenity or category of amenity may include a label such as "Next to Grocery Store." A second reservation selection input 706 may have a label 710 that identifies a charging entity 116 as the "Fastest" in the map area of the charging station map user interface 700. The determination that a charging selection is the quickest may be based on the charging queue or the charging speed. For example, the quickest may be determined based on real time information from EVs currently charging at the charging station to determine when a currently charging EV will finish. A third reservation selection input 708 may be associated with a label that identifies a charging entity 116 as the "Cheapest." The determination that a charging selection is the cheapest may be based on a dynamic pricing scheme, load on the grid, source of electricity, etc. Accordingly, the reservation selection inputs may include labels that identify different incentives, amenities, and/or categories of amenities associated with the different charging stations. In this manner, a users' charging behavior may be shifted when the load on grid is expected to be high, by increasing the charging price during those times. Thus, the labels can facilitate managing the load on the grid.

The labels may be determined based on related charging information may be based on the current location 702 of the requesting vehicle 102 as well as other vehicle information including, for example, the speed, direction, planned path of the requesting vehicle 102, etc. The labels may further be based on related charging information specific to the charging stations, such as the location of the charging station, relative distances between the charging station and other points of interest (e.g., coffee shops, gas stations, grocery stores, parks, attractions, etc.) The labels may be calculated based on one or more aspects of the related charging information and presented as a superlative.

Whether the charging data is based on the requesting vehicle 102, vehicle information, charging data, and/or the charging entity 116, the data may be collected in real-time via an operable connection for computer communication with the requesting vehicle 102 and/or the remote server 108, for example, to transmit and receive data, as discussed above. In another embodiment, perspective and/or real-time price data may include charging rates during a certain period of time (e.g., hourly, daily, weekly), charging rates to charge the requesting vehicle 102 at various charging speeds (e.g., conventional electric vehicle charging speed, fast electric vehicle charging speed, charging power levels) from one or more charging stations.

In addition to displaying the reservation selection inputs for selected categories, the charge application 118 may display selected charging information such as the arrival time, wait time, finish time, estimated cost to charge, etc. so that the user can quickly assess the information that reservation selection inputs are based on. For example, the "Fastest" label 710 is based on the estimated charging speed based on the occupancy rate.

The arrival time of the requesting vehicle 102 for the related charging information may be based on the current location 702 of the requesting vehicle 102 as well as other vehicle information including, for example, the speed, direction, planned path of the requesting vehicle 102, etc. The wait time may be based on the current queue at the charging entity 116 2 or the expected queue at the charging entity 116 at the arrival time. The finish time may be based on real-time data, such as the SOC of the requesting vehicle 102, the expected SOC of the requesting vehicle 102 at the arrival time, the charging speed of the charging entity 116, the user preferences, the wait caused by any vehicle currently charging at the charging station, etc. For example, determining the finish time may include receiving real-time data from at least one charging station within the remaining distance or within the remaining distance within a predetermined distance of the at least one perspective travel path of the requesting vehicle 102. Accordingly, information about currently charging electric vehicles at the charging stations may be used to determine the finish time of the requesting vehicle 102. Likewise, the estimated cost to charge the requesting vehicle 102 may also be based on the SOC of the requesting vehicle 102, the expected SOC of the requesting vehicle 102 at the arrival time, the charging speed of the charging entity 116, the user preferences, etc. Accordingly, users may reserve the at least one charging entity 116 for charging the requesting vehicle 102 by selecting one or more labels based on incentives, amenities, categories of amenities.

The charging information may be visually emphasized based on the label associated with the reservation selection inputs. For example, if the second reservation selection input 706 is labeled "Fastest" with the label 710 then the related charging information for Finish Time may be emphasized. The emphasis on the charging station map user interface 700 may be illustrated with fonts that are bold, underlined, italicized, in color, and/or highlighted, among others. Accordingly, the label 710 may be indicative of the charging speed of each of the charging entities 116, which is estimated based on the occupancy status of the corresponding charging entity 116. The charging entities 116 may then be recommended to the user based on the estimated charging speed. Accordingly, the user can make a more informed decision when selecting a charging entity 116 based on occupancy even though the current location 702 of the requesting vehicle is not the location of the charging entity 116, such that the requesting vehicle 102 is not present at the charging entity 116. Thus, the user can make this decision before arriving at the charging entity 116 to assess the availability of charging stations 112 at a charging entity 116 and/or the charging speed before arriving at the charging entity 116. The systems and methods herein are directed to improving the computer technology that allows a user to make a reservation at a charging entity 116, thereby improving the user's experience.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein.

A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for selecting a charging entity based on occupancy status, comprising:
    determining a current geo-location of a requesting vehicle;
    determining a current state of charge of a battery of the requesting vehicle;
    identifying a plurality of charging entities that are within a remaining distance that the requesting vehicle is capable of traveling based on the current geo-location of the requesting vehicle and the current state of charge of the battery of the requesting vehicle, wherein a charging entity of the plurality of charging entities is associated with one or more charging stations configured to provide a charge to the requesting vehicle;
    determining occupancy statuses for one or more charging entities of the plurality of charging entities, wherein an occupancy status indicates a number of the one or more charging stations of the charging entity occupied by a charging vehicle;
    estimating charging speeds for the one or more charging entities based on the occupancy statuses, wherein a charging entity is associated with at least one default charging speed, and wherein estimating charging speeds for the one or more charging entities includes applying an occupancy factor to the at least one default charging speed based on the occupancy status of the charging entity compared to a maximum occupancy status of the charging entity;
    presenting a charging station map user interface that pin points the current geo-location of the requesting vehicle and the one or more charging entities, wherein the one or more charging entities are presented with labels based on the estimated charging speeds; and
    reserving a charging station of a selected charging entity of the plurality of charging entities by selecting a label of the one or more charging entities that is presented on the charging station map user interface.

2. The computer-implemented method of claim 1, wherein the occupancy status is a ratio of the number of the one or more charging stations of the charging entity that are occupied to a total number of charging stations of the charging entity.

3. The computer-implemented method of claim 1, wherein a charging station is occupied by a charging vehicle when a position of the charging vehicle prevents the requesting vehicle from receiving a charge from the charging station.

4. The computer-implemented method of claim 1, further comprising:
determining estimated times of arrival for the requesting vehicle at the plurality of charging entities, wherein determining occupancy statuses for the one or more charging entities of the plurality of charging entities includes predicting occupancy statuses at the one or more charging entities for a corresponding estimated time of arrival.

5. The computer-implemented method of claim 1, wherein the occupancy status is occupied or not occupied, and wherein determining occupancy statuses for the one or more charging entities includes receiving an occupied signal or a free signal for each charging station associated with a charging entity.

6. The computer-implemented method of claim 1, wherein the occupancy factor is inversely related to the occupancy status and reduces the charging speed when the occupancy status is higher.

7. The computer-implemented method of claim 1, wherein the labels include a fastest charging time label that indicates the charging entity capable of a fastest charging time.

8. A system for presenting electric vehicle charging options, comprising:
a memory storing instructions when executed by a processor cause the processor to:
determine a current geo-location of a requesting vehicle;
determine a current state of charge of a battery of the requesting vehicle;
identify a plurality of charging entities that are within a remaining distance that the requesting vehicle is capable of traveling based on the current geo-location of the requesting vehicle and the current state of charge of the battery of the requesting vehicle, wherein a charging entity of the plurality of charging entities is associated with one or more charging stations configured to provide a charge to the requesting vehicle;
determine occupancy statuses for one or more charging entities of the plurality of charging entities, wherein an occupancy status indicates a number of the one or more charging stations of the charging entity occupied by a charging vehicle;
estimate charging speeds for the one or more charging entities based on the occupancy statuses, wherein a charging entity is associated with at least one default charging speed, and wherein estimating charging speeds for the one or more charging entities includes applying an occupancy factor to the at least one default charging speed based on the occupancy status of the charging entity compared to a maximum occupancy status of the charging entity;
present a charging station map user interface that pin points the current geo-location of the requesting vehicle and the one or more charging entities, wherein the one or more charging entities are presented with labels based on the estimated charging speeds; and
reserve a charging station of a selected charging entity of the plurality of charging entities by selecting a label of the one or more charging entities that is presented on the charging station map user interface.

9. The system of claim 8, wherein the occupancy status is a ratio of the number of the one or more charging stations of the charging entity that are occupied to a total number of charging stations of the charging entity.

10. The system of claim 8, wherein a charging station is occupied by a charging vehicle when a position of the charging vehicle prevents the requesting vehicle from receiving a charge from the charging station.

11. The system of claim 8, further comprising:
determining estimated times of arrival for the requesting vehicle at the plurality of charging entities, wherein determining occupancy statuses for the one or more charging entities of the plurality of charging entities includes predicting occupancy statuses at the one or more charging entities for a corresponding estimated time of arrival.

12. The system of claim 8, wherein the occupancy status is occupied or not occupied, and wherein determining occupancy statuses for the one or more charging entities includes receiving an occupied signal or a free signal for each charging station associated with a charging entity.

13. The system of claim 8, wherein the labels include a fastest charging time label that indicates the charging entity capable of the fastest charging time.

14. A non-transitory computer readable storage medium storing instructions that when executed by a computer, which includes a processor perform a method, the method comprising:
determining a current geo-location of a requesting vehicle;
determining a current state of charge of a battery of the requesting vehicle;
identifying a plurality of charging entities that are within a remaining distance that the requesting vehicle is capable of traveling based on the current geo-location of the requesting vehicle and the current state of charge of the battery of the requesting vehicle, wherein a charging entity of the plurality of charging entities is associated with one or more charging stations configured to provide a charge to the requesting vehicle;
determining occupancy statuses for one or more charging entities of the plurality of charging entities, wherein an occupancy status indicates a number of the one or more charging stations of the charging entity occupied by a charging vehicle;
estimating charging speeds for the one or more charging entities based on the occupancy statuses, wherein a charging entity is associated with at least one default charging speed, and wherein estimating charging speeds for the one or more charging entities includes applying an occupancy factor to the at least one default charging speed based on the occupancy status of the charging entity compared to a maximum occupancy status of the charging entity;
presenting a charging station map user interface that pin points the current geo-location of the requesting vehicle and the one or more charging entities, wherein the one or more charging entities are presented with labels based on the estimated charging speeds; and
reserving a charging station of a selected charging entity of the plurality of charging entities by selecting a label of the one or more charging entities that is presented on the charging station map user interface.

15. The non-transitory computer readable storage medium of claim 14, wherein the occupancy status is a ratio of the number of the one or more charging stations of the charging entity that are occupied to a total number of charging stations of the charging entity.

16. The non-transitory computer readable storage medium of claim 14, wherein a charging station is occupied by a charging vehicle when a position of the charging vehicle prevents the requesting vehicle from receiving a charge from the charging station.

17. The non-transitory computer readable storage medium of claim 14, determining estimated times of arrival for the requesting vehicle at the plurality of charging entities, wherein determining occupancy statuses for the one or more charging entities of the plurality of charging entities includes predicting occupancy statuses at the one or more charging entities for a corresponding estimated time of arrival.

18. The non-transitory computer readable storage medium of claim 14, wherein the occupancy status is occupied or not occupied, and wherein determining occupancy statuses for the one or more charging entities includes receiving an occupied signal or a free signal for each charging station associated with a charging entity.

19. The non-transitory computer readable storage medium of claim 14, wherein the labels include a fastest charging time label that indicates the charging entity capable of a fastest charging time.

* * * * *